(No Model.)
J. RUTHERFORD.
APPARATUS FOR COMPRESSING AND HOLDING BALLS OF TWINE WHILE BEING TIED.
No. 302,211. Patented July 15, 1884.
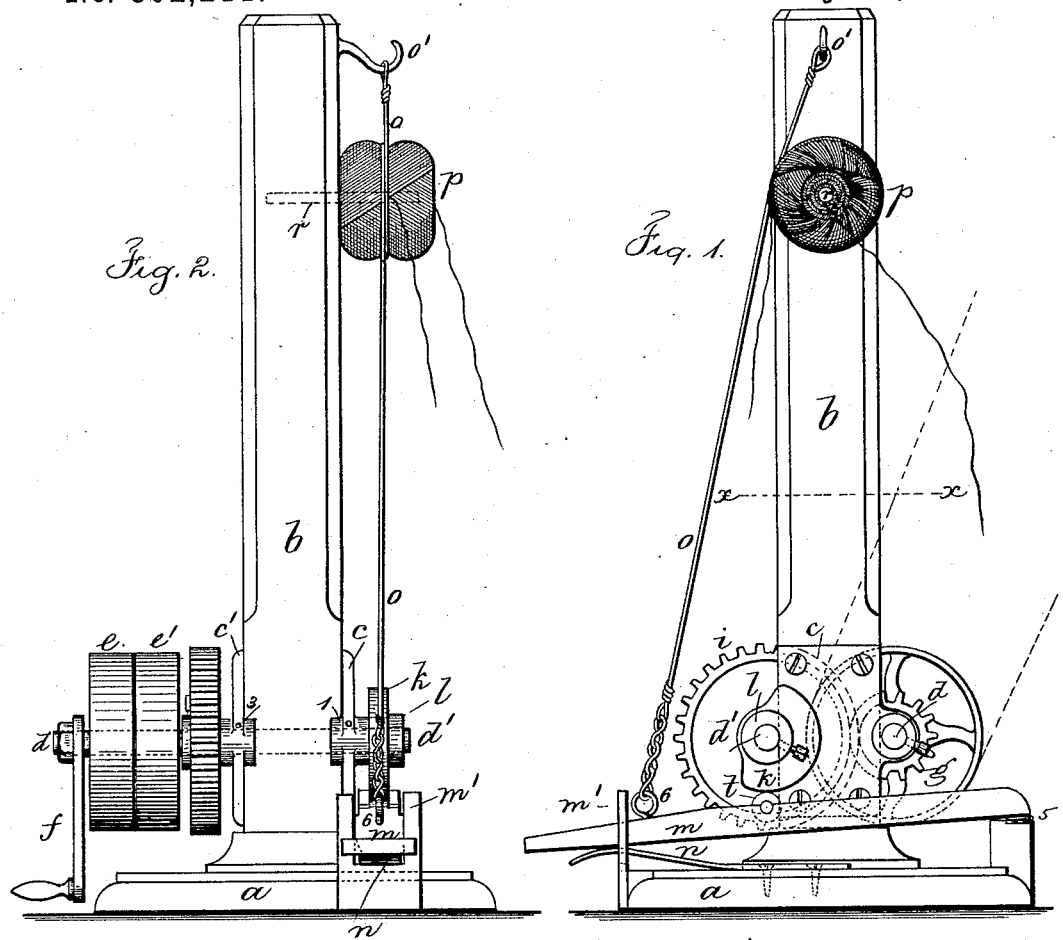
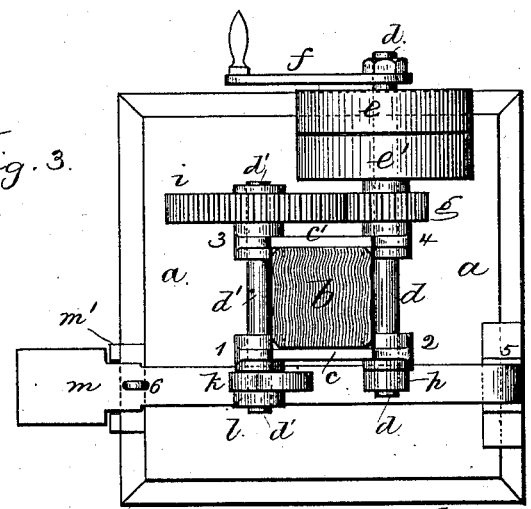
Witnesses
Chas. H. Smith
Harold Serrell
Inventor
John Rutherford
per Lemuel W. Serrell
atty

UNITED STATES PATENT OFFICE.

JOHN RUTHERFORD, OF BROOKLYN, ASSIGNOR TO BUCHANAN & LYALL, OF NEW YORK, N. Y.

APPARATUS FOR COMPRESSING AND HOLDING BALLS OF TWINE WHILE BEING TIED.

SPECIFICATION forming part of Letters Patent No. 302,211, dated July 15, 1884.

Application filed September 26, 1883. (No model.)

*To all whom it may concern:*

Be it known that I, JOHN RUTHERFORD, of Brooklyn, in the county of Kings and State of New York, have invented a new and useful Improvement in Apparatus for Compressing and Holding Balls of Twine While Being Tied; and the following is declared to be a description of the same.

In the manufacture of balls of twine it becomes necessary to fasten the loose end of twine left projecting from the exterior of the completed ball as it comes from the machine. This is done by hand by winding said loose end around the outer circumference of the ball and passing the end finally under one of the coils.

My invention has for its object the compression of the ball of twine to solidify the same and hold it while the end of the twine is being wound around the ball and fastened.
The ball of string to be tied is placed upon a peg in a standard, and a wire is secured by a loop in its upper end to a hook above the ball of twine. This wire passes down and around the circumference of the ball at the center part, and down to an eye in the treadle. This treadle is lifted by a spring under it, and when the treadle is raised and the wire is slack a ball to be tied is placed upon the peg, and the wire passes around its circumference. A cam upon a revolving shaft is provided, and as the cam comes around it bears against a roller in the treadle, depressing said treadle against the action of the spring and tightening the wire around the ball of twine, compressing it at the central portion, and holding it thus compressed a sufficient length of time for the attendant to wind the string around its circumference in the depression made by the wire, and to pass the end under one of the coils thus made. I prefer, before winding this end, to take the loose end projecting from the center of the ball of twine and lay it over the exterior of the ball and wind the other end over it. This will secure both ends, and when the ball is used the end from the center of the ball need only be pulled out of its confinement under the wound coils. As the cam revolves further and passes off the roller, the treadle is raised, the wire slackened, the tied ball is removed and another substituted, and the operations repeated.

In the drawings, Figure 1 is a side elevation of the machine. Fig. 2 is an elevation endwise of the machine, and Fig. 3 is a plan of the machine at the line *x x* of Fig. 1.

The base *a* and standard *b* are generally made of wood and connected together, or, if made of metal, are preferably cast as one piece. The frames *c c'* are secured upon the standard *b*, and are made with bearings 1 2 3 4 for the shafts *d d'*. Upon the shaft *d* are the pulleys *e e'*, for driving the mechanism by a belt by power, *e* being the fast pulley, and *e'* the loose pulley. A hand-crank, *f*, may be attached to this shaft *d* for use, if desired. Upon this shaft *d* is the toothed wheel *g*, meshing with the toothed wheel *i* upon shaft *d'*. There is a collar, *h*, clamped upon the shaft *d* to keep the parts in place. The shaft *d'* has upon it the cam *k* and a clamping-collar, *l*, and the speed of motion communicated from shaft *d* to shaft *d'* is reduced and timed to the desired rate by the difference in size of the toothed wheels *g i*, the smaller wheel being on the power-shaft.

The treadle *m* is hinged at 5 to a standard upon the base *a*, and its moving end is guided in a fork-shaped piece, *m'*, upon the base *a*, and there is a spring, *n*, secured upon the base *a* to raise the treadle when released from the cam *k*. There is a roller, *t*, let into the surface of the treadle *m*, and the cam *k* bears against this roller to depress the treadle. The peg *r* in the standard *b* receives the ball of twine *p*, and the wire *o* passes around the ball, one end being held by the hook *o'*, and the other end being secured either itself or by links to an eye, 6, in the forward end of the treadle *m*. The revolution of the cam *k* by the means herein described acts upon the roller *t*, depressing the treadle *m*, and tightening the wire *o* around the ball of twine *p*. When the ball of twine is placed on the peg *r*, sufficient twine is unwound from its outer end for tying around the ball. The loose end from the center of the ball is now laid across the side or circumference of the ball as the wire *o* is tightened and the ball compressed, and the loose end from the exterior of the ball being held by the wire from unwinding is wound around the ball adjacent to and in the groove made by the tightened wire, and confines the center end of the twine until it is removed for use. The end of the twine is passed under one of the coils to hold it in place. The releasing of the treadle and wire by the cam $k$ allows the ball to be removed and a fresh one substituted for tying, and in this way the operation is repeated. The ball of twine, upon being removed, expands; but it is held by the surrounding coil.

I claim as my invention—

1. The combination, with the base $a$ and standard $b$, of the shafts $d$ $d'$, pulleys $e$ $e'$, toothed wheels $g$ $i$, cam $k$, roller $t$, treadle $m$, spring $n$, peg $r$, and wire $o$, passing around the ball of twine and connected to the treadle, as and for the purposes set forth.

2. The combination, with the peg $r$, for holding the ball, and the standards $b$, of the wire $o$, passing around the ball, the treadle $m$, spring $n$, roller $t$, cam $k$, and mechanism, substantially as described, for operating said parts and tightening the wire for compressing the ball of twine and holding it while being tied, as set forth.

Signed by me this 14th day of September, A. D. 1883.

JOHN RUTHERFORD.

Witnesses:
 GEO. T. PINCKNEY,
 HAROLD SERRELL.